United States Patent [19]

Ohzeki

[11] Patent Number: 4,586,086
[45] Date of Patent: Apr. 29, 1986

[54] FACSIMILE COMMUNICATION RELAY SYSTEM

[75] Inventor: Yoshiaki Ohzeki, Atsugi, Japan

[73] Assignee: Ricoh Company, Ltd., Japan

[21] Appl. No.: 635,419

[22] Filed: Jul. 30, 1984

[30] Foreign Application Priority Data

Jul. 29, 1983 [JP] Japan .................................. 58-137823

[51] Int. Cl.[4] .......................... H04N 1/00; H04N 1/32
[52] U.S. Cl. ..................... 358/256; 358/257; 340/825.54; 371/33
[58] Field of Search ........................ 358/256, 257, 280; 371/33, 34, 62; 340/825.52, 825.54, 825.55, 505; 179/2 DP, 2 R; 455/24, 69; 375/3, 4

[56] References Cited

U.S. PATENT DOCUMENTS

| | | | |
|---|---|---|---|
| 3,535,439 | 10/1970 | Matthews et al. | 358/257 |
| 3,866,175 | 2/1975 | Sefert, Jr. et al. | 340/825.52 |
| 4,274,114 | 6/1981 | Kozima | 358/257 |
| 4,304,001 | 12/1981 | Cope | 371/8 |
| 4,410,883 | 10/1983 | Cope | 371/8 |
| 4,524,393 | 6/1985 | Ohzeki | 358/280 |
| 4,532,379 | 7/1985 | Tsukioka | 179/2 R |

Primary Examiner—Michael A. Masinick
Assistant Examiner—John K. Peng
Attorney, Agent, or Firm—Guy W. Shoup

[57] ABSTRACT

A facsimile communication relay system includes a relay station which temporarily stores image information to be transmitted from a source station to a destination station, for example, at a desired time. In accordance with the present invention, address and image information once transmitted and thus temporarily stored in the relay station is returned to the source station thereby allowing an operator at the source station to check the condition of the information received at the relay station, and the image information stored at the relay station is made available for transmission to the destination station only if an enable transmission signal is transmitted from the source station to the relay station by the operator within a predetermined time period.

4 Claims, 3 Drawing Figures

FACSIMILE COMMUNICATION RELAY SYSTEM

BACKGROUND OF THE INVENTION

1. Field of the Invention

This invention relates in general to a data communication system and particularly to a relay system in facsimile communication.

2. Description of the Prior Art

As one form of facsimile communication, proxy communication is often used. In proxy communication, image information from a facsimile source station is once transmitted to a facsimile relay station where the image information is temporarily stored in its image memory and then the image information is transmitted from the relay station to a facsimile destination station designated by the source station. Typically in this mode of operation, upon transmission of image information from the relay station to the destination station, the relay station sends a relay complete report to the source station. Thus, until the source station receives the relay complete report from the relay station after having transmitted address of destination and image information with or without designated relaying time to the relay station, it cannot be sure at the source station as to whether the image information might have been transmitted to a wrong station due to an error in address information caused for example by a transmission line error. In addition, even if there has been no error in transmission procedure, there could be caused a loss or disturbance of image information, which cannot be detected at the source station.

Under the circumstances, in accordance with the prior art relay system, communication is interrupted if a line error has occurred five times or more in succession or the number of line errors per page has exceeded a predetermined number while the relay station is receiving image information, or alternatively, the image information of preceding page, which has been received previously, is transmitted to the destination station. However, in accordance with these prior art schemes, it cannot be checked at the source station as to whether the line error occurred is at a critical or non-critical portion of information, and, furthermore, transmission of information to a wrong station as described above cannot be prevented.

SUMMARY OF THE INVENTION

It is therefore a primary object of the present invention to obviate the disadvantages of the prior art as described above and to provide an improved facsimile communication system.

Another object of the present invention is to provide an improved facsimile communication relay system capable of insuring image information to be transmitted to an intended destination station.

A further object of the present invention is to provide an improved facsimile communication relay system which allows to check the condition of information transmitted to a relay station from a source station upon completion of transmission.

A still further object of the present invention is to provide an improved facsimile communication relay system capable of providing an increased error-free communication operation.

Other objects, advantages and novel features of the present invention will become apparent from the following detailed description of the invention when considered in conjunction with the accompanying drawings.

DESCRIPTION OF THE PREFERRED EMBODIMENTS

Figure 1:
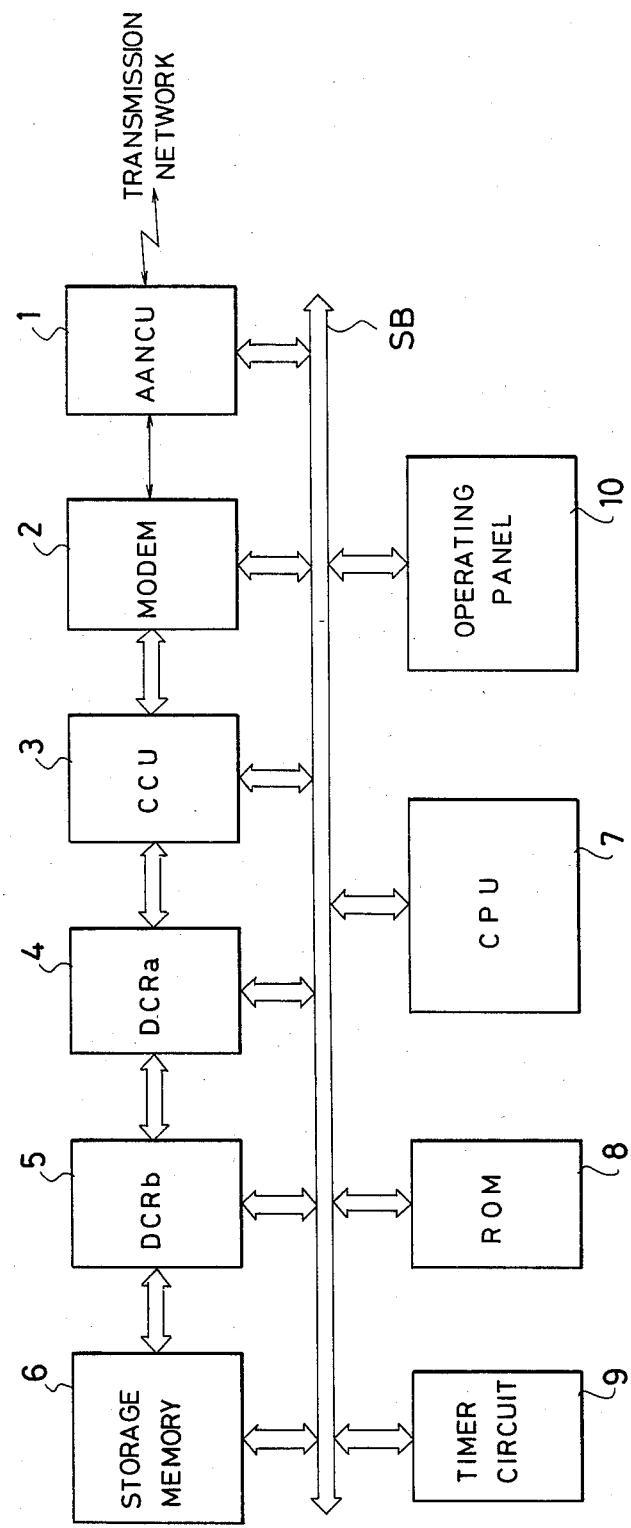
FIG. 1 is a block diagram showing a facsimile relay system constructed in accordance with one embodiment of the present invention.

Referring now to FIG. 1, there is shown in block form a facsimile communication relay system which is constructed in accordance with one embodiment of the present invention. As shown, the relay system includes an automatic answering and calling net control unit or AANCU 1 which automatically establishes an electrical connection to a transmission network such as public telephone line network and which is provided with a call reception detecting function and an automatic dialing function. The relay system also includes a MODEM 2, which modulates and demodulates a coded image signal and a transmission control procedural signal in accordance with a predetermined modulating and demodulating method, and a communication control unit or CCU 3 which handles, among other things, framing and deframing of transmission control procedural signal and error checking.

Also provided in the relay system of FIG. 1 is a first code compander unit or DCRa 4, which serves to convert an image signal to be transmitted into codes in the form suitable for facsimile transmission and to decode a received signal into the original image signal, and a second code compander unit or DCRb 5 which carries out coding of the image signal decoded by the first compander unit 4 during receiving mode in the form suitable to be stored into a storage memory and decoding of the image signal supplied from the storage memory 6 during transmitting mode. The storage memory 6 contains an image signal storing section where an image signal is stored and a management information storing section where management information, such as address and relaying time information, is stored.

The relay system shown in FIG. 1 also includes a central processing unit or CPU 7 which controls the operation of AANCU 1, MODEM 2, CCU 3, DCRa 4, DCRb 5 and memory 6, a read only memory or ROM 8 which stores a control program to be used by CPU 7 and a timer circuit 9 which supplies time data to the present system. Also provided as shown is an operating panel 10, which is provided with a variety of operating keys (not shown) required for controlling the operation of this relay system by an operator and a variety of indicator lamps (not shown) for indicating the operating condition of the system to the operator. It is to be noted that such elements as AANCU 1, MODEM 2, CCU 3, DCRa 4, DCRb 5, memory 6, ROM 8, timer circuit 9 and operating panel 10 are connected to CPU 7 via a system bus line SB for transmission of signals therebetween.

Figure 2A:
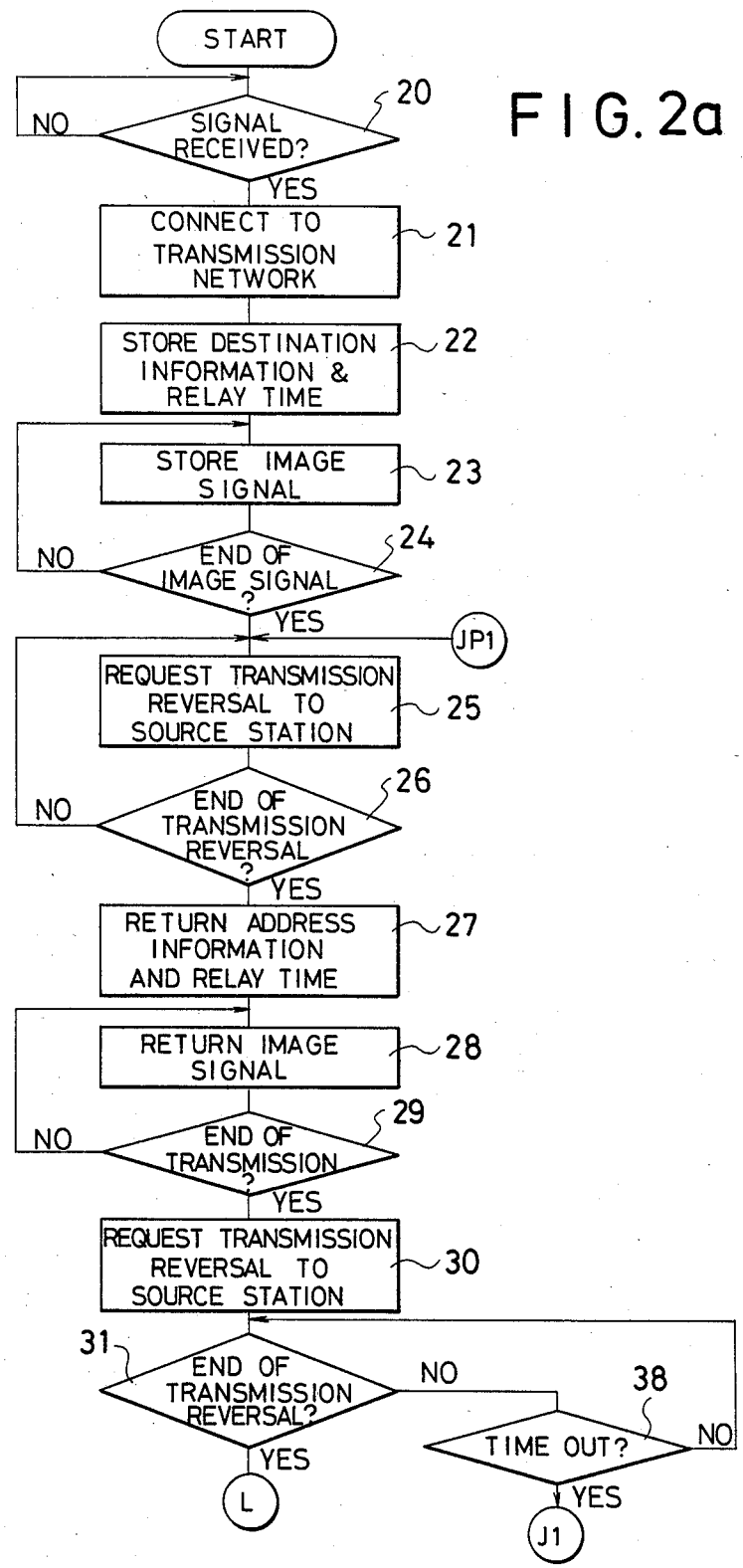
FIGS. 2a and 2b, which are to be combined as indicated by a matching letter "L", show a flow chart showing the sequence of steps which follow when the relay system has received a request for relay.
Figure 2B:
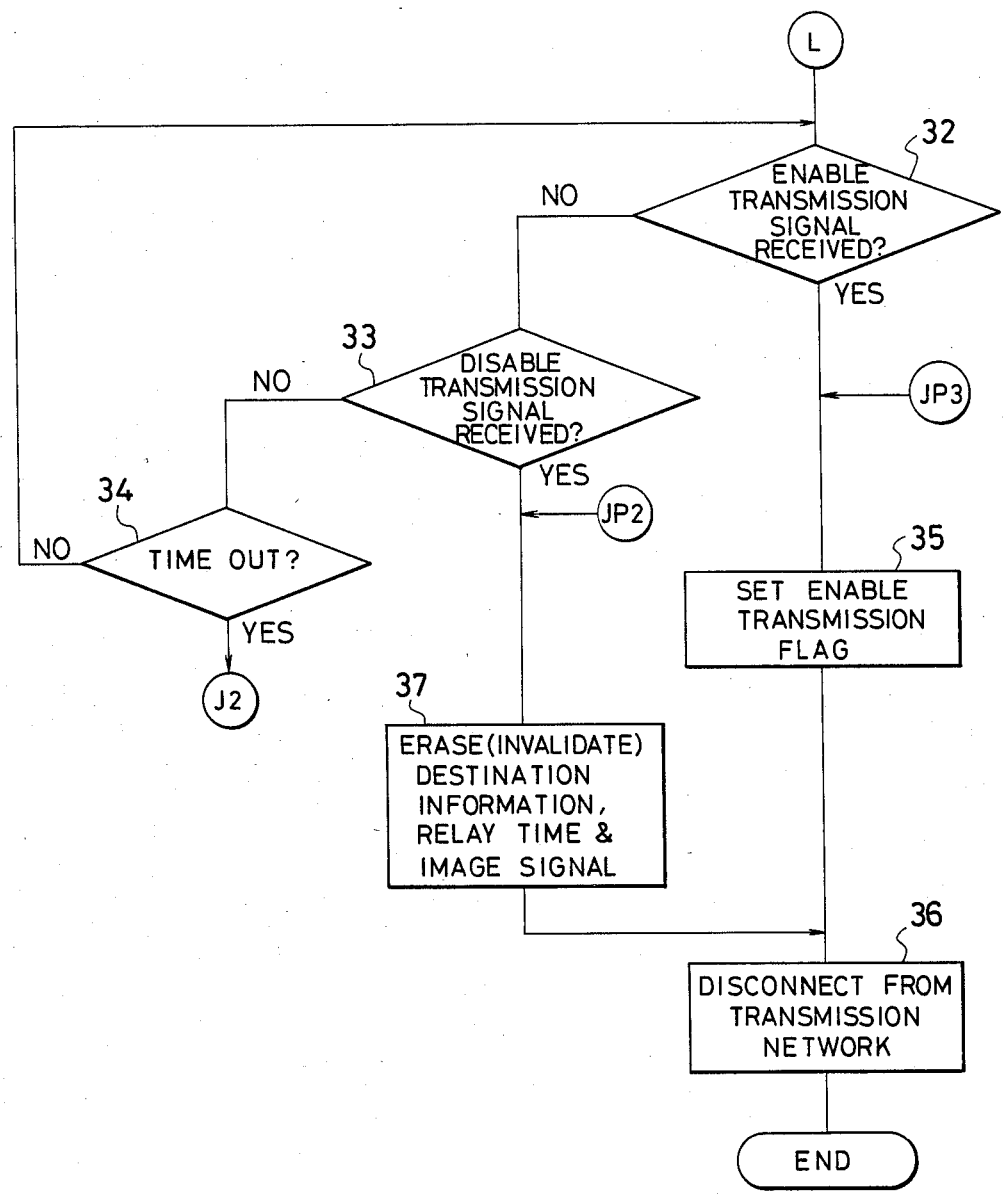

With the above-described structure, it will now be described below with reference to the flow chart shown in FIGS. 2a and 2b as to the operation which follows when the relay system of FIG. 1 has received a request to relay from a source station.

Now, at a source station (not shown), after setting the address of relay station and relaying time and placing an original having image information to be transmitted in position, when an operator dials to place a call, it is detected at AANCU 1 and then the arrival of a call is apprised to CPU 7. Thus, CPU 7 supplies a command to AANCU 1 to have the relay system of FIG. 1 electrically connected to the transmission network (from step 20 to step 21 in the flow chart), so that a transmission route is established between the source station (not shown) and the relay station to be ready for initiating a transmission protocol. As a result, in the protocol prior to transmission of message, the relay station receives the address of relay station and relaying time as transmitted from the source station. This information is extracted by CCU 3 and supplied to CPU 7 which then causes this information of address of relay station and relaying time to be stored into the management information storing section of storage memory 6 (step 22).

Then, when an image signal is transmitted from the source station, CPU 7 causes all of the image signal to be stored into the image signal storing section of storage memory 6 (loop between steps 23 and 24). Of course, during this operation, the image signal is stored into the memory 6 after having been coded by DCRb 5. It is to be noted that there is a correspondence between the management information storing section where address and relay time information is stored and the image information storing section where coded image signals are stored.

Upon completion of reception of all of image signals, the relay station sends a request of transmission reversal to the source station (step 25). Such a transmission reversal may, for example, be carried out by sending RTP (retrain positive) to the source station and then a procedural signal DTC (digital transmission command), as defined in CCITT Recommendation T30. When the transmission reversal is completed (step 26 to step 27), CPU 7 reads out the address of relay station and relaying time from the management information storing section of memory 6 and supplies the information thus read out to CCU 3 to be returned to the source station (step 27). Then, the coded image signal is read out of the image information storing section of storage memory 6 and supplied to the second code compander unit 5 where the coded signal is decoded to the original image signal, which is then supplied to the first code compander unit 4 to be converted into a coded signal suitable for transmission, from where the coded signal is transmitted to the source station via CCU 3, MODEM 2 and AANCU 1 (loop defined by steps 28 and 29).

Upon completion of returning of all of the image signals to the source station, the relay station once again sends a request of transmission reversal to the source station (step 30), in which case the relay station serves as a receiving station. Upon completion of this second transmission reversal (step 31), CPU 7 activates a timer (35 seconds) incorporated therein and waits for a signal, enable transmission signal or disable transmission signal, to be sent from the source station (loop defined by steps 32, 33 and 34).

At the source station, the operator evaluates the returned information, including address of relay station, time to relay and image signal. If the returned information has been found to be appropriate, the operator operates a control panel of the source station to send an enable transmission signal to the relay station; on the other hand, if the returned information has been found to be inappropriate, then the operator sends a disable transmission signal to the relay station.

When the relay station receives an enable transmission signal (step 32), an enable transmission flag indicating that the image signal may be transmitted to a destination station is set in the management information storing section of memory 6 (step 35), which is followed by the step of having the relay system disconnected from the transmission network (step 36) to terminate signal processing operation. On the other hand, when the relay system receives a disable transmission signal (step 33), all of the information is deleted (step 37) and it proceeds to step 36 because this is the case in which a critical error is present in the stored image data or there is an error in the information of address or time to relay. As indicated at step 37, the data may be deleted, erased or invalidated.

On the other hand, if the timer times out without receiving either one of enable and disable transmission signals within a predetermined time period (step 34), or if the transmission reversal has not been completed within a predetermined time period (step 38), then either one of the following three procedures will follow.

(1) It jumps to point JP1 to again enter into step 25 thereby repeating the first transmission reversal to have address of relay station, time to relay and image signal returned to the source station. In the preferred embodiment, it is so structured that this retrial is repeated up to three times in accordance with CCITT Recommendation T30 and yet if time out still occurs, it jumps to point JP2 to have the stored data invalidated and to have the relay system disconnected from the transmission network.

(2) Since there is no assurance as to the quality of the stored data, it jumps to point JP2 to have the stored data erased and to have the relay system disconnected from the transmission network.

(3) Since it is believed that the stored data is not too bad to transmit, it jumps to point JP3 to establish the condition that the stored data may be transmitted.

It is to be noted that selection of either one of the above three is previously determined between the source and relay stations, for example, during protocol procedure.

In the above-described embodiment, it is so structured that the relay station sends a request of transmission reversal to the source station upon completion of reception (step 25). Alternatively, it may also be so structured that the relay system is once disconnected from the transmission network upon completion of reception and the operation of transmission reversal for returning the stored data to the source station is carried out after calling of the source station by the relay station. It may further be so structured that the relay system is disconnected from the transmission network upon completion of transmission reversal and an enable or disable transmission signal is supplied to the relay station after the operator has called the relay station from the source station by dialing.

As described above, in accordance with the present invention, the relay station once returns the data stored therein to the source station to allow the operator at the source station to check the condition of reception of data at the relay station so that proper relaying of image information can be secured thereby preventing the occurrence of transmission of data to a wrong station and omission of critical data.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A facsimile communication relay method wherein image information to be transmitted from a source station to a destination station is once stored in a relay station, the method comprising the steps of:

transmitting address information and image information from said source station to said relay station to be once stored therein;

returning said address and image information once stored in said relay station to said source station; and causing said image information stored in said relay station to be available for transmission if a control signal has been supplied from said source station to said relay station within a predetermined time period as from the completion of said returning step or to carry out a predetermined operation if said control signal has not been supplied from said source station to said relay station within said predetermined time period.

2. The method of claim 1 wherein said predetermined operation includes a retrial step for returning to said step of returning said address and image information.

3. The method of claim 1 wherein said predetermined operation includes a step for making said address and image information invalid.

4. The method of claim 1 wherein said predetermined operation includes a step of transmitting said image information to said destination station.

* * * * *